Eugene C. MacMullan
Dave W. Madden
INVENTORS

Eugene C. MacMullan
Dave W. Madden
INVENTORS

3,361,646
FRACTIONATION CONTROL SYSTEM FOR CONTROLLING AND OPTIMIZING FRACTIONATION TOWER MATERIAL BALANCE AND HEAT INPUT

Eugene C. MacMullan, Wharton, and Dave W. Madden, Sparta, N.J., assignors to Esso Research and Engineering Company, a corporation of Delaware
Filed Dec. 11, 1963, Ser. No. 329,783
2 Claims. (Cl. 202—206)

The present invention is concerned with a method and apparatus for continuously controlling and optimizing fractionation tower material balance and heat input from measurements of feed rate and composition. More specifically, the present invention is concerned with an improved method and apparatus whereby overhead product and reboiler analog computers are utilized to continuously determine and adjust the overhead product-bottoms product split and heat input in a fractionating column.

In a preferred embodiment, the present invention is concerned with a method and apparatus whereby the overhead and reboiler computers will control overhead product rate and heat input to the reboiler so that the internal reflux and the ratio of overhead rate to feed rate will be maintained at the economic optimum for all feed rates. Additionally, as the tower capacity limit is reached and the optimum reflux ratio can no longer be maintained, the overhead and reboiler computers automatically adjust tower conditions to balance the amount of bottoms product in the overhead stream and the amount of overhead product in the bottoms stream in a manner to minimize operating costs.

There are numerous fractionator control systems known to the art directed toward obtaining products of substantially constant quality. However, these control systems are generally designed to obtained overhead product at substantially constant composition. While the prior art systems serve well in this function, constant overhead composition is obtained at the expense of poor bottom product quality and increased steam cost.

It is, therefore, an object of the present invention to provide a fractionator control system which will optimize overall fractionator operation when process upsets cause the fractionator feed rate and composition to be materially altered.

Another object of this invention is to provide computer control techniques wherein fractionation tower heat input and material balance are continuously and automatically optimized so as to minimize tower operating costs.

The invention is described according to a preferred embodiment. The fractionator control system of the preferred embodiment of the invention serves to continuously minimize the sum of three fractionation tower operating debits. One debit is that obtained for bottom material in the overhead stream. Another is the debit for overhead material in the bottoms stream and the third is steam or heating fluid cost. A computer manipulates the overhead rate and the reboiler heat input to continuously optimize the sum of these three debits both above and below the fluid capacity limit of the tower from feed rate and composition data.

The desired heat input rate is set as a ratio of the feed rate up to a specified predetermined maximum limit. The computer calculates overhead rate from the following equation:

$$D = f(F)Rx$$

where,
$D$ = distillate rate
$F$ = feed rate
$R$ = economic factor based on the ratio of product values
$x$ = mole percent of the light key and lighter in the feed
$f(F) = F$ where $F^2$ is less than $b$
$f(F) = F + aF^2 - ab$ where $F^2$ is greater than or equal to $b$
$a$ = adjustable parameter
$b$ = fluid capacity limit of tower In operation, the chromatograph of the system measures the mole percentage of the light key and lighter materials in the fractionator feed stream. Pneumatic or electric signals from the chromatograph and the feed rate recorder located in the fractionator feed line are sent to the computer which calculates the overhead rate from the equations set forth above. This calculated rate is then transmitted by way of a dynamic compensator to the set point of the flow recorder controller (FRC) which controls overhead draw-off rate.

The dynamic compensator is used to account for the dynamic response characteristics of the tower so that when the computer takes corrective action after a feed rate or composition disturbance, the corrective action is not only of the correct magnitude but is also supplied at the right time. Basically, the computer calculates the steady state value of the overhead rate but the dynamic compensator adds transient terms to take care of the dynamic response characteristics of the particular fractionation tower.

Heat input to the tower is optimized by establishing a predetermined ratio of steam rate to feed rate and injecting steam into the reboiler in accordance with this ratio by ratioing up to the capacity limit of the tower. The reboiler computer serves to continuously make corrective changes to the flow recorder controller (FRC) located in the steam inlet line of the reboiler. When the capacity limit of the tower is exceeded, the reboiler computer automatically alters steam inlet rate to a predetermined optimum value for operation above the vapor capacity limit of the tower.

The factors, $a$, $b$, and $R$, are all factors which are based on experimental data which varies from tower to tower. $R$ determines the magnitude of corrective action for a given change in feed composition. The value of $R$ can be determined by plate to plate calculations or by trial and error methods in the field of the actual fractionation column. Factor $b$ determines the point at which the steam can no longer be ratioed to the feed rate because of tower size limitations and the optimum reflux ratio must be altered. This again can be determined in advance through calculation methods or by trial and error in the field. Factor $a$ is a scale factor indicative of the level of operation of the distillation tower. Factor $a$ is determined by plotting values of optimum overhead product rate $D$ against feed rate when the tower is operating at the fluid capacity limit $b$ of the tower. Factor $a$ is the slope of the line drawn through the data points of $D$ vs. $F$. The values of optimum overhead rate at feed rates at the fluid capacity limit $b$ of the tower are best obtained by running plate to plate calculations at a specific feed rate employing overhead rate. The overhead rate at which the total operating debit, that is, steam cost, debit for heavy key in the overhead stream, and debit for light key in the bottoms stream is at a minimum value is defined as the optimum overhead rate at a specific feed rate.

The present invention makes a significant advance in the art of fractionation tower control. Previous control systems which utilized operator manipulation of process variables are subject to severe limitations in that product quality fluctuated badly with any variation of fractionator feed rate and/or feed composition.

Various computer control techniques, such as that presented in Ser. No. 173,627, filed Feb. 16, 1962, now U.S. Patent 3,282,799, in the name of Eugene C. MacMullan, have been advanced to solve the problem of stabilizing overhead purity when fluctuations in feed rate and/or feed composition necessitate a change of process variables. The disclosure in the above-named application is herein incorporated by reference. While the above-mentioned computer system serves well in maintaining substantially constant overhead product purity, this result is achieved at the expense of poor quality bottoms product and high utilities cost.

The present invention provides a method and apparatus wherein using predetermined tower performance data, overhead product purity, bottoms product purity, and utility cost can be maintained at optimum levels when fractionator feed rate and/or composition fluctuate due to outside process upsets.

This and other advantages of the present invention will become apparent when viewed in the light of the accompanying drawings where:

Figure 1:
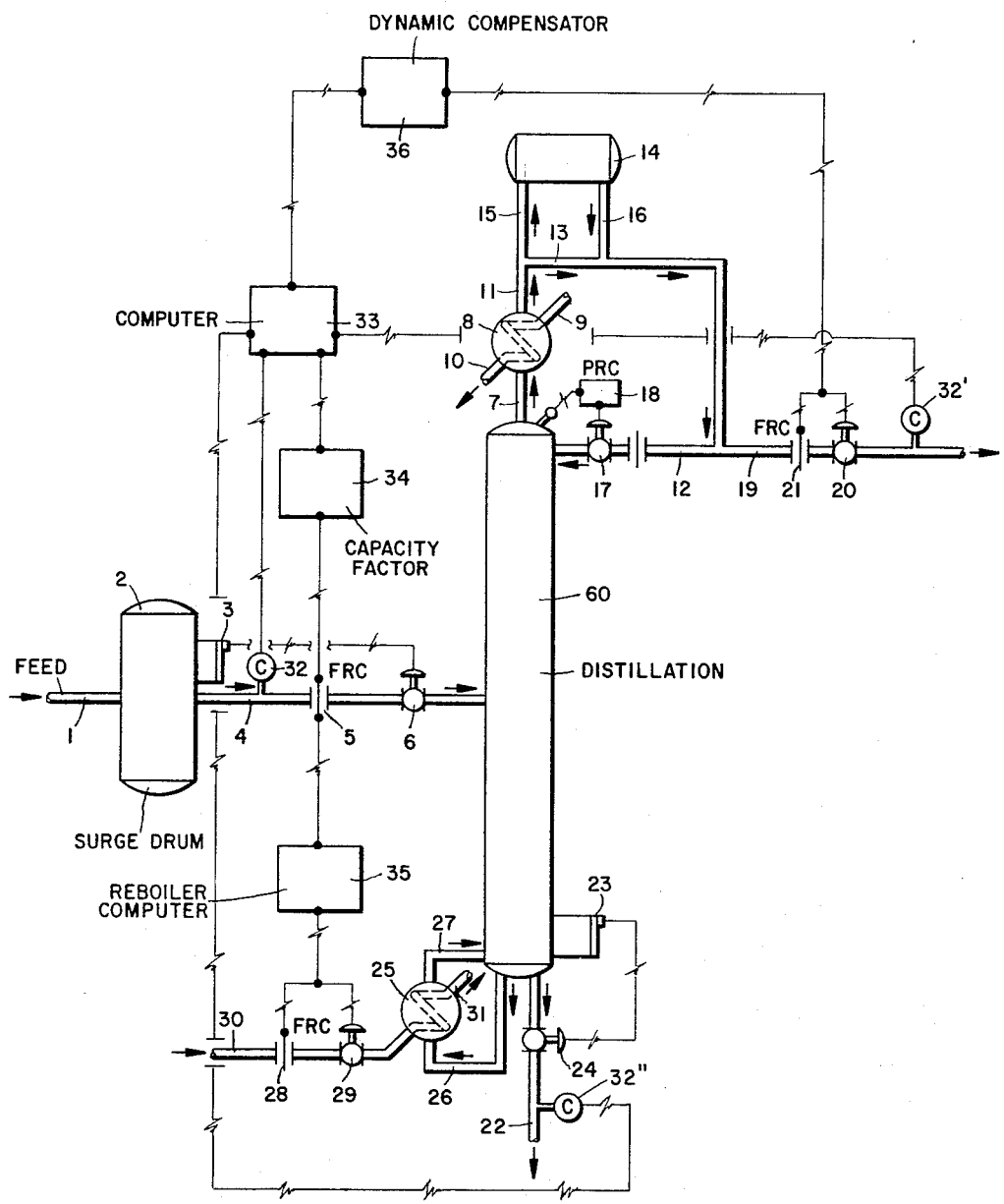
FIGURE 1 is a schematic representation of a fractionating column with the control system of the present invention.

Referring now to the drawing and initially to FIG. 1, reference numeral 60 designates generally a fractionating column. This column may be of any suitable type which utilizes any conventional liquid-vapor contacting devices known to the art, examples of which are the various types of fractionating trays or packings known to the art.

Numeral 1 designates the feed inlet line to feed surge drum 2. The feed stream which enters line 1 is generally a multicomponent mixture which is to be fractionated in column 60 into a relatively lower boiling stream which is taken off as overhead product, and a relatively higher boiling stream which is taken off as bottom product. The feed stream in line 1 is either liquid or vapor or a mixed liquid-vapor stream. The rate of flow of the feed stream in line 4 from feed surge drum 2 is measured by a rate of flow recorder 5. Feed flow through line 4 is controlled by valve 6 which is actuated by a level controller 3 on feed surge drum 2. Rate of flow to the fractionator is a function of level in surge drum 2 which is in turn a function of flow into the drum. Therefore, certain deviations in flow rate will occur due to process variations which occur outside of the fractionator system. Level controller 3 or surge drum 2 flow recorder 5 and valve 6 are control devices known to the art and can be any conventional equipment capable of performing the functions designated.

The vapor overhead stream is withdrawn from the fractionating column 60 by means of line 7. Line 7 connects the upper region of the fractionator 60 with condenser 8. Condenser 8 may be of any suitable type such as, for example, a shell and tube type condenser wherein a liquid coolant is passed through the tubes to condense the vapor stream of line 7, or an air-fin condenser wherein the vapor stream from line 7 passes through the tubes and air is circulated on the outer tube surface as the cooling medium.

By the preferred embodiment, a shell and tube condenser is used and a coolant such as water flows through condenser 8 by means of conduits 9 and 10. Rate of flow controllers can be utilized to control the rate of flow of coolant in line 9; however, their use is not depicted in this figure.

The condensate effluent from condenser 8 passes into line 11. All or a portion of the effluent can be directed into the reflux line 12 by means of bypass line 13, or can be directed into reflux drum 14 through line 15. Condensed overhead product can be sent to reflux line 12 directly from condenser 8 by means of lines 11 and 13, or from reflux drum 14 by means of line 16. A portion of the effluent in line 12 passes to column 60 through valve 17 as reflux. Pressure controller 18 adjusts the rate of flow of reflux in line 12 by actuating valve 17. The overhead product in line 19 is passed through valve 20 and may be disposed of by any suitable means. The rate of flow of overhead product in line 19 is controlled by rate of flow controller 21 which actuates valve 20. The mol fraction of the heavy key appearing in the overhead stream is determined by analyzer 32'.

The fractionating characteristics of the column at steady state are maintained substantially constant by use of a flooded condenser control technique. The flooded condenser control technique is applicable to fractionation systems wherein the overhead vapor is completely condensed. Pressure controller 18 and valve 17, which vary the rate of flow of reflux, are used to maintain the internal tower pressure at a substantially constant level. In operation, the condenser 8, which totally condenses the overhead vapor stream, has a preselected portion of the heat transfer surface covered with condensed liquid.

Therefore, when the internal column pressure increases, the flooded condenser control system and pressure control system serve to increase the rate at which reflux is returned to the column. As the reflux flow rate is increased, the liquid level in the condenser drops, exposing more condensing surface. This increased condensing surface is then available to condense the greater quantity of overhead vapor which is present in the column. In like manner, a decrease in column pressure is the result of a decrease in the quantity of vapor passing up through the column. Therefore, to maintain column pressure at an optimum level, the rate at which reflux is returned to the column is decreased. This will tend to raise the liquid level in the condenser and thus reduce the amount of exposed condensing surface.

Bottoms product is removed from the lower region of column 60 by means of line 22 at a rate which is controlled by liquid level controller 23. The mol fraction of light key in the bottoms product is determined by analyzer 32". Liquid level controller 23 actuates valve 24 to maintain a substantially constant liquid level in the bottom of the column 60.

Fractionation heat requirements are added to column 60 by means of reboiler 25. The reboiler may be of any suitable internal or external type; however, a reboiler of the external type such as a thermal-syphon type or a kettle type is preferred. Liquid from the bottoms section of the fractionation column 60 passes through line 26 to reboiler 25 wherein it is heated and partially or completely vaporized and returned to column 60 through line 27. The rate of heat input is controlled by rate of flow recorder 28 which actuates valve 29. A heating fluid such as steam passes through line 30 through valve 29 into reboiler 25 and out through line 31.

The operation of the system thus described is as follows. A sample of the feed stream is withdrawn from line 4 and passed to analyzer 32. Analyzer 32 may be any conventional continuous analyzer or even an extremely rapid discontinuous analyzer. Examples of such analyzers are infrared, ultraviolet, refractive index, chromatographic analysis, dielectric constant, as well as many other well-known methods of analysis. In the preferred embodiment of the present invention, a discontinuous analyzer such as a chromatographic analyzer is used. Analyzer 32 determines the mole percent of the light key and lighter components in the feed stream. The light key is the heaviest component in the feed stream which is desired to be taken overhead. The heavy key is the lightest component in the feed stream which is desired to be taken off as a component of the bottoms product. It should be understood that a certain quantity of the heavy key will appear in the overhead product and a certain quantity of the light key will appear in the bottoms product. This is due to imperfect fractionation.

The signal generated by analyzer 32, which may be either electric or pneumatic, passes to analog computer 33. A signal proportional to the square of the rate of flow of the feed stream in line 4 passes from rate of flow recorder 5 to capacity factor generator 34. Capacity factor generator 34 determines whether the signal from flow recorder 5 which is proportional to the square of the feed rate exceeds or is less than the fluid capacity limit $b$ of fractionation tower 60. A signal, representing either $F^2$ or $b$ is transmitted to computer 33. Computer 33, which will be discussed in more detail in conjunction with FIGURE 2, continuously computes the quantity of overhead product to be withdrawn in line 19 from the equations previously set forth. The computer transmits a signal, either electric or penumatic, to dynamic compensator 36 which in turn transmits the modified signal to rate of flow controller 21 which actuates valve 20 to obtain the desired rate of flow of overhead product from line 19. Thus, analog computer 33 is used to reset rate of flow controller 21 to obtain the desired rate of overhead product.

Separately, the optimum heat input to reboiler 25 is calculated by reboiler computer 35 from feed rate data transmitted by flow recorder 5. Reboiler computer 35 generates a signal, either electric or pneumatic, to flow recorder 28 which actuates valve 29 to obtain the desired rate of flow of heating fluid into the reboiler.

While the apparatus and method of FIGURE 1 have been described with reference to the use of specific pieces of process equipment, it should be understood that various modifications may be made without effecting the desired function. For example, surge drum 2 and reflux drum 14 can be omitted from service. Additionally, a portion of the fractionation heat requirements can be supplied by a preheater located in feed line 4. In this type of situation reboiler computer 35 can apportion necessary volumes of heating fluid to the heating spaces of reboiler 25 and the feed line preheater. Additionally, certain pumps and valves have been omitted from the drawings for purposes of simplicity and clarity.

Figure 2:
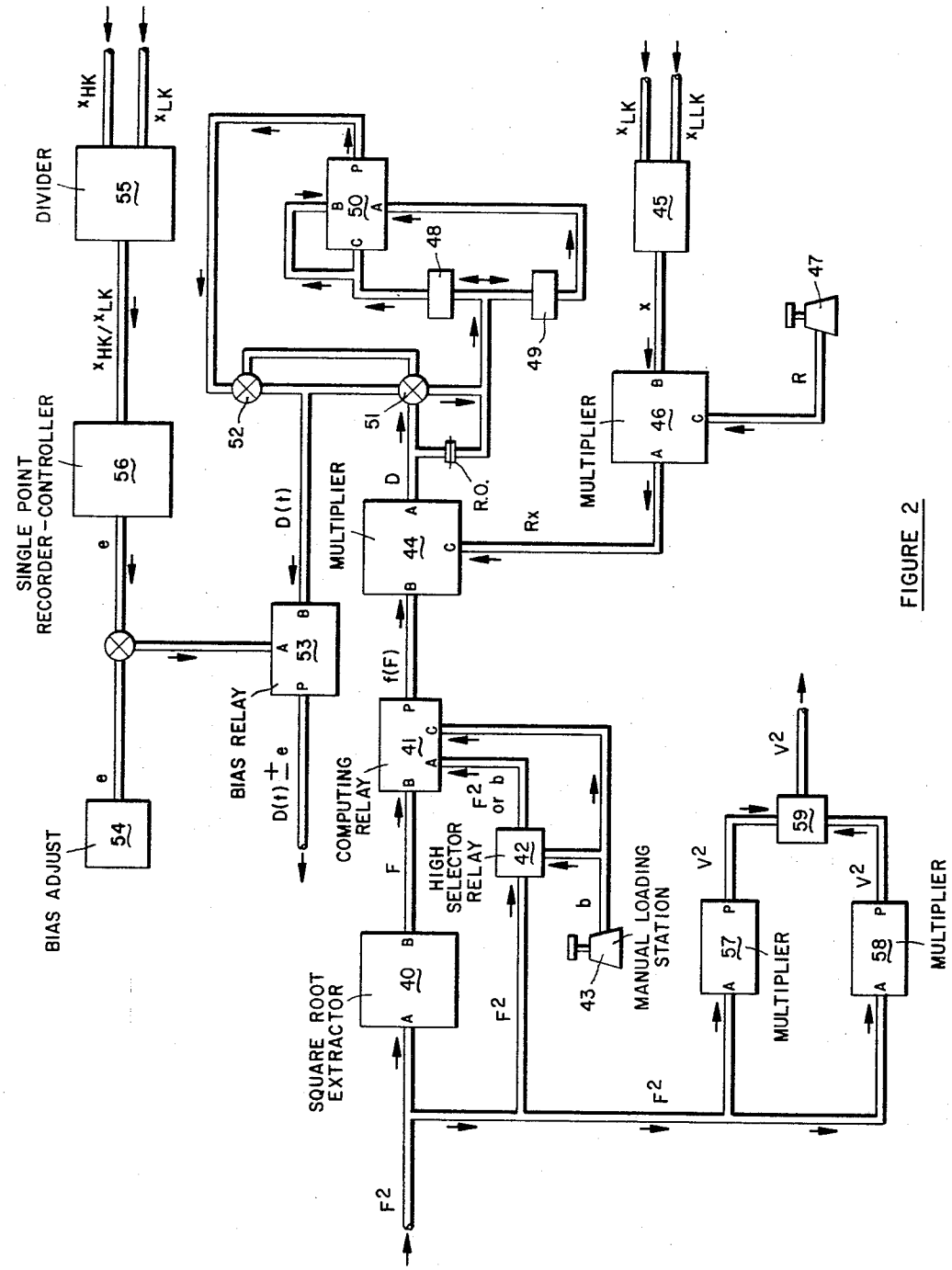
FIGURE 2 is a schematic representation of the pneumatic analog computer network which is used in the control system of the present invention.

FIGURE 2 represents the computer control system of the present invention. Referring now to FIGURE 2, rate of flow recorder 5 located in feed line 4 transmits a pneumatic signal proportional to the square of the feed rate $F^2$ to square root extractor 40. Square root extractor 40 takes the square root of the flow rate signal and generates and transmits a signal representative of the feed rate $F$ to computing relay 41. Additionally the value of $F^2$ from flow rate recorder 5 is transmitted to a high selector relay 42. The predetermined value of $b$, equivalent to the fluid capacity limit of the tower is generated by a manual loading station 43. The signal representative of the value of $b$ is transmitted to high selector relay 42 and computing relay 41. The high selector relay 42 measures the values of $F^2$ and $b$ being transmitted to the relay, selects the large value and transmits it to computing relay 41.

Computing relay 41 calculates $f(F)$ utilizing the equations stated previously. In operation, the computing relay transmits a signal as $f(F)$ which is equal to $F+aK-b$, where $K$ is the value transmitted by the high selector relay. Therefore, when $b$ is greater than $F^2$, $K$ is equal to $b$, and $f(F)=F$. When $F^2$ is greater than or equal to $b$, $K$ is equal to $F^2$ and $f(F)=F+aF^2-ab$. Following the computation operation by computing relay 41, a signal representative of $f(F)$ is sent to multiplier 44.

Returning again to FIGURE 1, analyzer 32, which by the preferred embodiment is a chromatographic device, transmits a signal representative of the mole fraction of the light key $x_{LK}$ present in the feed stream and the mole fractions of the lighter than light key materials present in the feed stream to summing device 45. Summing device 45 serves to determine the total mole fraction of material which is desired to be taken as overhead product and to transmit a signal representative of the total mole fraction $x$ of materials to be taken as overhead product to multiplier 46. In the case of a fractionation system having a number of components lighter than the light key, the function of the summing device can be replaced by an integration and transmission component of the analyzer.

Multiplier 46 multiplies the value of $x$ by R to give an output of $Rx$. The predetermined value of R which is indicative of the magnitude of change in overhead product rate necessary for a given change in feed composition, is generated by manual loading station 47. The output, $Rx$, of multiplier 46 is transmitted to multiplier 44 which multiplies $Rx$ by $f(F)$ to give an output $f(F)Rx$ which is equal to D, the overhead distillate rate.

In normal operation, the output of multiplier 44 passes through the dynamic compensator assembly which consists of variable restrictors 48 and 49 and computing relay 50. Two three-way pneumatic valves 51 and 52 permit the bypassing of the dynamic compensator. The dynamic compensator assembly serves to apply the corrective action of changing the overhead rate at the right time. This function is necessary since the overhead and bottoms compositions do not change at a rate which is equal to the change in feed rate to the fractionating column. Therefore, in most fractionating operations, a dynamic error exists resulting in the variance of overhead and bottoms composition from the desired level even though corrective action of changing of the overhead rate has been taken.

The dynamic compensator assembly eliminates the dynamic error in overhead and bottoms composition due to changing the overhead rate by shaping the output signal from multiplier 44 in a predetermined manner. The output from the dynamic compensator is in the form of a transient compensation curve. The curve begins at the steady-state value at which the system was operating prior to receiving a signal indicating a change in the overhead rate. Depending upon whether the overhead rate is increased or decreased, the compensation curve increases or decreases to a peak value which exceeds the amount of corrective action calculated in multiplier 44. This predetermined amount of excess correction is defined as percent overshoot and the exact amount needed for any particular application is determined experimentally with each individual fractionation system and is that amount required in order to have the fractionation system respond quickly to obtain the desired overhead product values thus preventing the formation of dynamic lags in composition change when changes in overhead rate are made. After reaching the peak value, the curve gradually decays to the level of operation corresponding directly to the feed rate calculated by multiplier 44.

In operation, the value of D from multiplier 44 passes through pneumatic valve 51 and passes into variable restrictors 48 and 49 and then to computing relay 50. The time required to reach the peak value is controlled by the setting on restrictor 48. The time required to decay the curve to the calculated overhead value is controlled by the setting of restrictor 49. The percent overhoot is a function of the gain setting of computing relay 50. The output of computing relay 50 ($D_{(t)}$) is passed to bias relay 53 by way of pneumatic valve 52.

Bias relay 53 serves to add or subtract an error function to the output value of $D_{(t)}$ from the dynamic compensator. The error function, which can be supplied by a manual bias adjustment 54 or by a feedback control system comprising a divider 55 and a controller 56, is necessary to maintain the optimum operation of fractionation system due to changing tower conditions and drift in the mechanical calibration of the components of the computer.

The present computer control system does not operate to obtain any fixed overhead or bottoms purity. Rather, it continuously balances the overhead impurity debit. This means that at low feed rates, higher purities are automatically maintained for both streams. As the feed rate increases, both overhead and bottoms impurity levels are changed so as to maintain the economic balance between them. Therefore, the computer control system serves to maintain at an economic optimum the percentage of heavy key appearing in the overhead product and the percentage of light key appearing in the bottoms product.

By the preferred embodiment the feedback control system determines the ratio of the mole percent of the heavy key in the overhead stream to the mole percent of the light key in the bottoms stream, compares this ratio to the desired optimum economic ratio, and adjusts the signal to the overhead controller to compensate for any deviations.

In operation, signals representative of the mole fraction of the heavy key appearing in the overhead stream and the mole fraction of the light key appearing in the bottoms stream are transmitted from analyzers 32′ and 32″, respectively, that determine the composition of the overhead and bottoms stream to divider 55. The analyzers used may be of any suitable type such as those described with reference to analyzer 32. Divider 55 forms the ratio of the mole percent of the heavy key to the mole percent of the light key and transmits a signal representative of this value to controller 56. Controller 56 compares the input value with the desired economic optimum value and issues an error signal to bias relay 53 if any deviation between the two values exists.

In another embodiment, the error signal can be generated utilizing a manual bias adjustment device 54 which transmits the error signal to bias relay 53 to change the level of operation of the computer.

The output of bias relay 53, a linear function, is transmitted to rate of flow controller 21 which resets valve 20. By the preferred embodiment of the present invention, flow controller 21 is modified to be actuated by a linear signal. A squared function is usually used to reset a rate of flow controller because conventional rate of flow controllers operate on a differential signal. That is, conventional rate of flow controllers utilize a difference in pressure to obtain a measurement of flow rate. It will be appreciated by those skilled in the art that this difference in pressure is a function of the square of flow rate. For convenience, however, rate of flow controller 17 is reset using a linear function. It is visualized, however, that a squared function could be used in the present system to reset rate of flow controller 21 by squaring the signal from bias relay 53.

A second control loop is provided to optimize the reboiler heat input by balancing the cost of incremental heating value against the value of improved fractionation it provides.

In operation, a signal proportional to $F^2$ is transmitted from rate of flow recorder 5 located in feed line 4 to multipliers 57 and 58. Each multiplier multiplies the input value $F^2$ by a predetermined constant. By the preferred embodiment, heat input to the fractionating tower is optimized by ratioing the steam rate V to the feed rate up to the fluid capacity limit of the tower $b$. The value $b$ is the point at which the liquid on the top tray of the fractionator begins to be entrained in the upflowing vapor. As stated previously, the value of $b$ is a function which varies with each fractionation system and must be determined experimentally. After the fluid capacity limit of the tower has been reached, heat input to the tower is optimized by ratioing the steam to feed to maintain a maximum internal reflux rate within the tower at the tower capacity limit.

Therefore, multiplier 57 multiples $F^2$ by a predetermined constant applicable for tower operation below the fluid capacity limit of the tower. Simultaneously, multiplier 58 multiplies $F^2$ by a constant applicable for tower operation above the fluid capacity limit of the tower, and adds to this value a constant equal to the value of the point where the curve of heating fluid rate squared ($V^2$) vs. feed rate squared ($F^2$) intercepts the $V^2$ axis. The multiplying constants utilized in both multipliers are equal to the slopes of the curves of $V^2$ vs. $F^2$ for operation both above and below the fluid capacity limit of the tower. The output signals from each of the multipliers is equivalent to the desired heating fluid rate squared for operation both above and below the fluid capacity limit of the tower. The signals from both multipliers are transmitted to low selector relay 59. Relay 59 determines which of the two values is of the smallest magnitude and transmits this value of heating fluid rate squared ($V^2$) to controller 28 located in heating fluid line 30. It should be understood that controller 28 could be modified to be actuated by a linear signal, in which event a square root extractor would operate on the signal from low selector relay 59 before being transmitted to controller 28.

While the computer system of the present invention has been described with reference to the use of pneumatic components, it should be understood that equivalent electrical and mechanical components could be used to perform the desired function.

The computer components may be of any suitable type, and in the preferred embodiment of this invention are manufactured by the Foxboro Instrument Company and the Moore Products Company. Square root extractor 40 is a commercially available instrument, Foxboro model 46S-10-42. Computing relays 41 and 50 are model 56-1 Foxboro instruments. High selector relay 42, Moore Products Hi Selector Relay, multiplier 44, Foxboro model 46S-8-64, summing device 45, Foxboro model 56-4-3, multiplier 46, Foxboro model 46S-8-32, bias relay 53, Foxboro model 56-4-9, manual bias adjuster 54, Foxboro model 514F, divider 55, Foxboro model M/465-9, controller 56, Foxboro model M/46, multiplier 57, Foxboro model 56-6-39, low selector relay 59, Moore Products Lo Selector Relay, and multiplier 58, Foxboro model 56-6-33 are all commercially available instruments.

The following example demonstrates the improved operational results obtained with the use of the instant invention.

*Example 1*

The effectiveness of the present computer control system was determined on a test with a 75 tray superfractionator which operated to split a mixed butane feed into isobutane and n-butane. Prior to the installation of the computer control system, the percent isobutane in the bottoms stream and n-butane in the overhead stream had varied almost randomly from 0 to 10%. With the present control system, the isobutane in bottoms stream was held between 1 and 3% varying only with tower loading to maintain an economic balance with the n-butane in the overhead stream.

Based on product values, the material balance of the tower is optimized when it maintains a ratio of about 3/1 between the percent n-butane overhead and the percent isobutane in the bottoms stream. During the test interval, the computer held the ratio at 3.0±0.75 while the ratio with the system being manually controlled varied randomly from 0.1 to 20. Another variation of this invention involves the use of providing means for directing a feed mixture containing at least two components to a fractionation zone, wherein means are provided for withdrawing an overhead product from an upper portion of said zone and for returning a portion of said overhead product to the zone as external reflux, with means thereafter for withdrawing a bottom product from a lower portion of said zone, and means for introducing heat into said lower portion of said zone, in combination therewith a control system comprising means to establish a first signal representative of the rate of flow of feed mixture to said fractionation zone, means to establish a second signal representative of the mole percent of the light key and lighter components of said feed mixture, means responsive to said first and second signals to establish a third signal representative of the rate of withdrawal of overhead product from said fractionation zone, means responsive to said third signal to adjust the rate of withdrawal of overhead product from said fractionation zone, means responsive to said first signal to establish a fourth signal representative of rate of introduction of heat to said fractionation zone, means responsive to said fourth signal to adjust the rate of introduction of heat to said fractionation zone, means to establish a fifth signal $x_{HK}$ representative of the mole percent of the heavy key in said overhead product, means to establish a sixth signal $x_{LK}$ representative of the mole percent of the light key in said bottoms product, means responsive to said fifth and sixth signals to establish a seventh signal representative of the ratio $x_{HK}/x_{LK}$, means responsive to said seventh signal to compare said seventh signal with a predetermined optimum value to establish an eighth signal representative of the deviation of said seventh signal from said optimum value, means responsive to said eighth signal to increase the value of said third signal when the ratio $x_{HK}/x_{LK}$ is less than the predetermined optimum value and to decrease said third signal when the ratio is greater than the predetermined optimum value.

An additional modification which may be to this apparatus would include means for over compensating said third signal representative of the change in feed rate comprising means for initially causing the rate of overhead product withdrawal substantially to increase beyond the rate corresponding directly to said third signal representative of the change in feed rate and control means for gradually reducing said over-compensated rate of overhead product withdrawal to a rate corresponding directly to said third signal.

Resort may be had to various modifications and variations of the invention without departing from the spirit of the discovery or the scope of the appended claims.

What is claimed is:

1. In a fractionation system wherein means are provided for directing a feed mixture containing at least two components to a fractionation column, wherein means are provided for withdrawing an overhead product from an upper portion of said zone and for returning a portion of said overhead product to the zone as external reflux, with means thereafter for withdrawing a bottom product from a lower portion of said zone, and means for introducing heat into said lower portion of said zone, in combination therewith a control system comprising means to measure the feed flow rate to the said fractionation column and to establish a first signal representative of the measured flow rate, means to measure the mol percent of light key and lighter components in said feed and to establish a second signal representative of the measured mol percentage, means responsive to said first and second signals to establish a third signal representative of the rate of withdrawal of overhead product from said fractionation column, means responsive to said third signal to adjust the rate of withdrawal of overhead product from said fractionation column, means responsive to said first signal to establish a fourth signal representative of rate of introduction of heat to said fractionation column, means responsive to said fourth signal to adjust the rate of introduction of heat to said fractionation column, means to measure the mol percent of heavy key in the overhead product and to establish a fifth signal $x_{HK}$ representative of the measured mole percentage of the heavy key in said overhead product, means to measure the mol percent of light key in the bottoms product and to establish a sixth signal $x_{LK}$ representative of the measured mole percentage of the light key in said bottoms product, means responsive to said fifth and sixth signals to estabilsh a seventh signal representative of the ratio $x_{HK}/x_{LK}$, means responsive to said seventh signal to compare said seventh signal with a predetermined optimum value to establish an eighth signal representative of the deviation of said seventh signal from said optimum value, means responsive to said eighth signal to increase the value of said third signal when the ratio $x_{HK}/x_{LK}$ is less than the predetermined optimum value and to decrease said third signal when the ratio is greater than the predetermined optimum value.

2. The apparatus of claim 1 including means for overcompensating said third signal representative of the change in feed rate comprising means for initially causing the rate of overhead product withdrawal substantially to increase beyond the rate corresponding directly to said third signal representative of the change in feed rate and control means for gradually reducing said over-compensated rate of overhead product withdrawal to a rate corresponding directly to third signal.

References Cited
UNITED STATES PATENTS

| | | | |
|---|---|---|---|
| 2,453,205 | 11/1948 | Docksey | 202—160 |
| 2,882,693 | 4/1959 | Clay | 202—160 |
| 2,985,565 | 5/1961 | Bellinger | 202—160 |
| 3,018,230 | 1/1962 | Morgan | 203—3 |
| 3,143,643 | 8/1964 | Fluegel et al. | 235—151.12 |
| 3,156,628 | 11/1964 | Larrison | 203—3 |
| 3,224,947 | 12/1965 | Lupfer | 202—160 |
| 3,268,420 | 8/1966 | Webber et al. | 203—2 |
| 3,294,648 | 12/1966 | Lupfer et al. | 203—2 |

WILBUR L. BASCOMB, JR., *Primary Examiner.*